W. A. KITTS, Jr.
BLOW-OFF VALVE.
APPLICATION FILED JAN. 27, 1920.

1,414,651.

Patented May 2, 1922.

Inventor
W. A. Kitts Jr.
By Howard P. Denison
Attorney

UNITED STATES PATENT OFFICE.

WILLARD A. KITTS, JR., OF PATERSON, NEW JERSEY.

BLOW-OFF VALVE.

1,414,651.     Specification of Letters Patent.      Patented May 2, 1922.

Application filed January 27, 1920. Serial No. 354,413.

*To all whom it may concern:*

Be it known that I, WILLARD A. KITTS, Jr., of Paterson, in the county of Passaic, in the State of New Jersey, have invented new and useful Improvements in Blow-Off Valves, of which the following, taken in connection with the accompanying drawings, is a full, clear, and exact description.

This invention relates to certain improvements in blow-off valves of the class set forth in my pending applications, Serial No. 312,874, filed July 23, 1919, and Ser. No. 328,799, filed October 6, 1919, except that in the present application the gear disc valve or gate is raised and lowered or opened and closed with a rolling motion by direct engagement with a hand operated worm or screw, the length of which is equal to or greater than the distance of movement of the valve or gate from its closed position to its extreme open position.

The object is to obtain greater efficiency in speed and positiveness of operation by direct engagement between the worm and valve gear and by causing the valve to roll along a rack parallel with the axis of the worm, which not only reduces to a minimum the number of parts but also renders the valve as a whole more durable and reliable and when disposed in a vertical position as shown aids materially in the closing operation by the screw, particularly when the valves are of relatively large diameter.

Other objects and uses relating to specific parts of the valve as a whole will be brought out in the following description.

In the drawings

Figure 1:
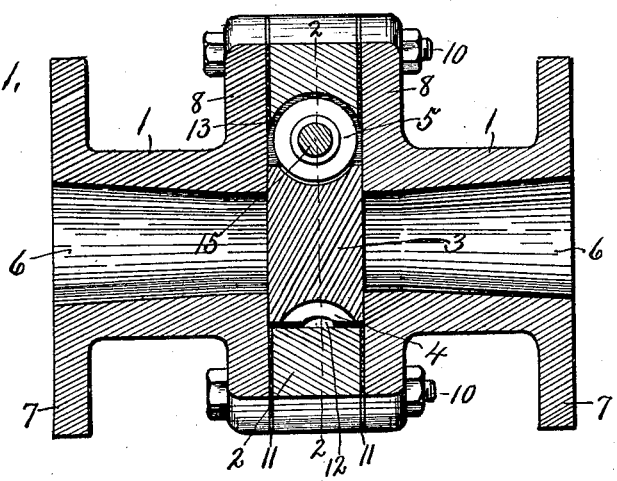
Fig. 1 is a horizontal sectional view of a blow-off valve embodying the various features of my invention taken in the plane of line 1—1, Fig. 2.

As illustrated this valve comprises opposite similar end sections —1—, an intermediate section —2—, a disc valve —3— having a worm gear —4— and a worm —5— meshing with the worm gear —4—, all of said parts being made of suitable metal and assembled in the manner hereinafter described.

The end sections —1— are provided with coaxial inwardly tapered passages —6— either of which may be connected to the blow-off pipe of a boiler or may be used in other relation for controlling the inlet or exit of liquid to or from a container, each section having its outer end provided with a flange —7— for securement to the part of the container to which the valve is to be attached.

The inner end faces of the sections —1— are substantially flat and parallel and are spaced a sufficient distance apart to receive between them the intermediate section —2—, the inner ends of the sections —1— being provided with flanges —8— which together with the intermediate section —2— are provided with registering bolt holes —9— for receiving clamping bolts —10— for firmly clamping the sections together end to end with suitable packings —11— at the joints to prevent leakage.

The section —2— is provided with a main chamber —12— and a branch chamber —13— communicating therewith and extending vertically parallel with the axis of the worm —5—.

The width of the main chamber —12— transversely of the axis of the valve —3— and passages —6— is slightly greater than the diameter of the inner ends of said passages or approximately equal to the diameter of the disc valve —3—, the lower wall —14— being below the axis of the passages —6— and is preferably semi-circular and concentric with said axis.

The upper wall —14'— of the main chamber —12— is also semi-circular and of the same radius as the lower wall —14— but reversed, the curvature of both walls being substantially the same as that of the valve disc —3—.

The distance between the lower and upper walls in the vertical plane of the axis of the passages —6— and valve disc —3— is substantially equal to twice the diameter of the valve disc to enable the latter to be moved from its closed position coaxially with the passages —6— to its extreme opened position wholly above said passages.

The branch chamber —13— is located at one side of the main chamber —12— and passages —6— and extends from a point below the horizontal plane of said axis to a plane slightly above the limit of upward movement of the axis of the valve disc —3— to receive a worm or gear as —5— of sufficient length to assure the movement of the valve disc from its closed position to its extreme opened position.

The worm —5— preferably extends from end to end within the chamber —13— to abut against the lower and upper end walls thereof for holding it against endwise movement and is preferably secured to a vertical shaft —15— having its lower and upper ends journaled in suitable bearings —16— and —17— in the intermediate section —2—, the upper end being extended through a suitable gland —18— to the exterior of the section —2— and is provided with a hand wheel —19— by which the shaft and worm may be rotated for imparting rotary movement to the valve disc —3—.

The valve disc —3— is of substantially the same axial length as the corresponding distance between the inner end faces of the sections —1— and its end faces are substantially flat to properly seat against the adjacent faces of the section —1— for effectively cutting off communication between the passages —6— in said sections when the disc is in its closed position.

The intermediate portion of the valve disc is provided with peripheral teeth —20— within the periphery of the ends of the disc and meshing with the worm —5—, the meshing engagement being maintained by the engagement of the disc with the wall of the main chamber —12— directly opposite the branch chamber —13— and worm —5—.

This opposite wall is provided with a toothed rack —21—, the teeth of which are preferably integral with the intermediate section —2—, the lower end of said rack terminating a sufficient distance above the horizontal plane of the axis of the passages —6— to enable the valve disc —3— to be rotated freely in one direction without engaging the teeth of the rack and at the same time to permit the engagement of the gear teeth therewith when the disc is rotated in an opposite direction.

In like manner the upper end of the toothed rack —21— terminates below the horizontal plane of the axis of the gear disc —3— when the latter is moved to its extreme upper position to permit said gear to be rotated in one direction against the upper wall of the main chamber —12— without engaging the teeth of said rack and permitting reengagement with said teeth when the gear is rotated in an opposite direction to positively return the valve to its closed position.

By permitting the valve to be rotated freely when in its closed or extreme open positions, permits its end faces to be fitted more securely to their seats on the adjacent ends of the sections —1— in case certain portions of said faces may become worn more than the other portions, this free rotation of the gears being effected by the rotation of the same worm or screw —5—.

Figure 2:
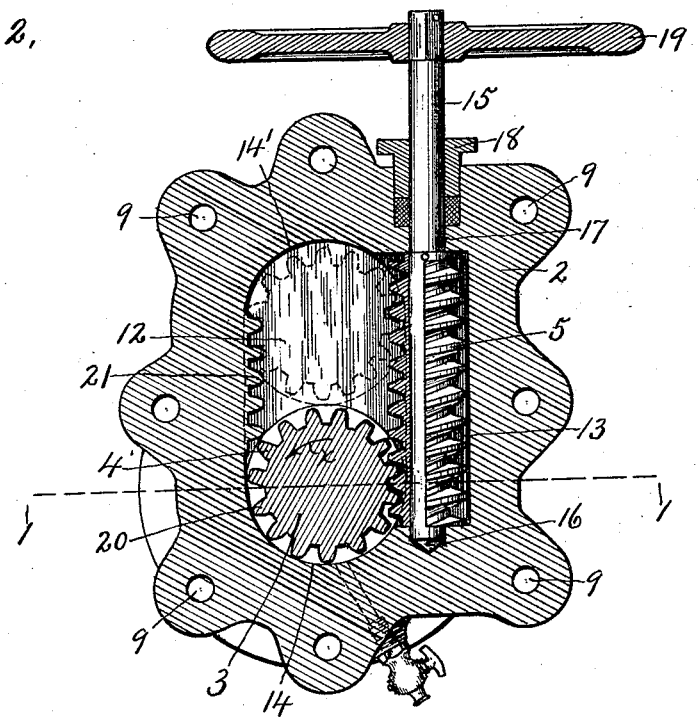
Fig. 2 is a vertical sectional view taken in the plane of line 2—2, Fig. 1.

The screw —5— is provided in this instance with a right hand thread and it, therefore, follows that when it is desired to open the valve from its closed position the rotation of the screw —5— to the right by means of the hand wheel —19— will cause the disc —5— to rotate in the direction indicated by arrow —X—, Fig. 2, thereby causing the teeth of said disc to engage the teeth of the rack —21— which in turn together with the operation of the screw will cause the disc to travel upwardly along the rack with a rotary motion until it reaches its extreme open position against the upper wall —14'— out of engagement with the teeth of the rack —21— whereupon the continued rotation of the worm in the same direction will cause the disc to rotate freely about its axis against the upper wall —14'— if it is desired to repolish the end faces of the valve before returning.

The rotation of the screw in the opposite direction will cause the teeth of the disc to reengage the teeth of the rack thereby returning the disc to its closed position with a reverse rotary motion until its teeth are disengaged from the rack —21— whereupon the continued rotation of the disc in the same direction may be effected to again regrind the valve to its seats if necessary.

The device constructed in the manner described is particularly simple, compact and highly efficient and permits the valve to be easily and quickly opened and closed with a minimum power without liability of overstraining any of the parts.

What I claim is:—

A blow-off valve of the character described, comprising a valve case having a passage therethrough, a valve disc movable to and from a position across said passage and provided with peripheral gear teeth, a rotary worm in direct engagement with the gear teeth at one side of the disc, means for rotating the worm, and a toothed rack for engaging the teeth at the opposite side of the disc and causing said disc to move with a rotary motion to and from a position across the passage as the worm is rotated in reverse directions, the relation of the gear teeth of the disc and rack permitting the gear teeth of the disc to be moved out of engagement with the rack when adjusted to one of its extreme positions to allow said disc to be rotated in one direction without engaging the teeth of the rack.

In witness whereof I have hereunto set my hand this 22nd day of January, 1920.

WILLARD A. KITTS, Jr.

Witnesses:
WARREN C. WUNDER,
THOS. J. E. HOLMES.